(12) United States Patent
Limbacher et al.

(10) Patent No.: US 11,590,974 B2
(45) Date of Patent: Feb. 28, 2023

(54) METHOD FOR ASSISTING A DRIVER IN THE DRIVING OF A MOTOR VEHICLE

(71) Applicant: AUDI AG, Ingolstadt (DE)

(72) Inventors: Reimund Limbacher, Ingolstadt (DE); Daniel Lepczyk, Schrobenhausen (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/316,437

(22) PCT Filed: Jul. 27, 2017

(86) PCT No.: PCT/EP2017/068966
§ 371 (c)(1),
(2) Date: Jan. 9, 2019

(87) PCT Pub. No.: WO2018/028997
PCT Pub. Date: Feb. 15, 2018

(65) Prior Publication Data
US 2019/0291733 A1    Sep. 26, 2019

(30) Foreign Application Priority Data

Aug. 10, 2016 (DE) ..................... 10 2016 214 822.2

(51) Int. Cl.
  *B60W 30/14* (2006.01)
  *B60W 50/16* (2020.01)
  *B60W 50/14* (2020.01)

(52) U.S. Cl.
  CPC .......... *B60W 30/143* (2013.01); *B60W 50/14* (2013.01); *B60W 50/16* (2013.01);
  (Continued)

(58) Field of Classification Search
  CPC ..... B60W 30/14–17; B60W 30/18163; B60W 40/08–09; B60W 2540/043;
  (Continued)

(56) References Cited

U.S. PATENT DOCUMENTS 9,043,115 B2   5/2015   Schuberth et al.
9,862,272 B2   1/2018   Schuberth et al.
(Continued)

FOREIGN PATENT DOCUMENTS

CN   102795224 A   11/2012
CN   103608643 A   2/2014
(Continued)

OTHER PUBLICATIONS

Mayser Christoph—English description of DE-102012211967-A1, via Espacenet patent translate, Oct. 20, 2020 (Year: 2020).*
(Continued)

*Primary Examiner* — Jeffrey C Boomer
*Assistant Examiner* — Paul Allen
(74) *Attorney, Agent, or Firm* — Sterne, Kessler, Goldstein & Fox P.L.L.C.

(57) ABSTRACT

Provided herein is a method for assisting a driver with driving a motor vehicle. The method includes ascertaining a permissible driving speed in a route section by evaluating environmental data describing the motor vehicle environment. The method further includes calculating a target maximum speed, which is lower than the permissible driving speed, by subtracting a predefined reduction amount from the permissible driving speed and/or by multiplying the permissible driving speed by a predefined scaling factor. The method further includes controlling at least one alert device for outputting an alert to the driver when a present driving speed of the motor vehicle exceeds the target maximum speed and/or controlling the driving speed of the motor vehicle by a longitudinally guiding driver assistance system, wherein the target maximum speed is used as a maximum speed or as a target speed.

14 Claims, 2 Drawing Sheets

(52) U.S. Cl.
CPC . *B60W 2510/244* (2013.01); *B60W 2530/209* (2020.02); *B60W 2540/043* (2020.02); *B60W 2540/30* (2013.01); *B60W 2552/05* (2020.02); *B60W 2554/80* (2020.02); *B60W 2555/20* (2020.02); *B60W 2555/60* (2020.02); *B60W 2556/50* (2020.02); *B60W 2720/10* (2013.01)

(58) Field of Classification Search
CPC .... B60W 30/143; B60W 50/14; B60W 50/16; B60W 2510/244; B60W 2530/209; B60W 2540/30; B60W 2552/05; B60W 2554/80; B60W 2555/20; B60W 2555/60; B60W 2556/50; B60W 2720/10; B60K 31/00; B60K 2031/00; B60K 2310/00; G05D 1/00
USPC ...................................................... 701/70–98
See application file for complete search history.

(56) References Cited

U.S. PATENT DOCUMENTS

| | | | |
|---|---|---|---|
| 10,029,684 B2 | 7/2018 | Schuberth et al. | |
| 2002/0085043 A1* | 7/2002 | Ribak | B60K 35/00 715/810 |
| 2005/0061562 A1 | 3/2005 | Mack | |
| 2005/0116854 A1* | 6/2005 | Beez | H01Q 19/062 342/70 |
| 2006/0052929 A1 | 3/2006 | Bastian et al. | |
| 2007/0001830 A1* | 1/2007 | Dagci | B60K 31/185 340/438 |
| 2008/0300766 A1* | 12/2008 | Kumabe | B60W 30/143 701/98 |
| 2009/0157274 A1* | 6/2009 | Park | G05G 1/30 701/70 |
| 2011/0160992 A1* | 6/2011 | Crombez | B60W 50/14 701/123 |
| 2011/0276216 A1* | 11/2011 | Vaughan | B60W 10/04 701/31.4 |
| 2012/0123657 A1* | 5/2012 | Taguchi | G01C 21/3469 701/93 |
| 2012/0176231 A1* | 7/2012 | Skaff | B60K 35/00 340/439 |
| 2012/0179314 A1* | 7/2012 | Gilman | B60L 50/51 701/22 |
| 2012/0239282 A1* | 9/2012 | Taguchi | G08G 1/096725 701/119 |
| 2013/0110367 A1* | 5/2013 | To | B60W 30/146 701/70 |
| 2013/0222175 A1 | 8/2013 | Smith et al. | |
| 2013/0297196 A1* | 11/2013 | Shida | B60W 30/143 701/119 |
| 2013/0328699 A1 | 12/2013 | Schramm et al. | |
| 2014/0244129 A1* | 8/2014 | Filev | B60W 50/0097 701/93 |
| 2014/0244130 A1* | 8/2014 | Filev | B60K 31/00 701/96 |
| 2014/0277872 A1* | 9/2014 | MacNeille | G01C 21/3415 701/22 |
| 2015/0053066 A1* | 2/2015 | Hampiholi | G06V 20/597 84/602 |
| 2016/0082947 A1 | 3/2016 | Naumann et al. | |
| 2016/0311423 A1* | 10/2016 | Storm | B60W 20/12 |
| 2016/0375795 A1* | 12/2016 | Liu | B60L 1/02 701/22 |
| 2017/0001638 A1* | 1/2017 | Yoon | B60W 30/143 |
| 2017/0015318 A1* | 1/2017 | Scofield | B64C 39/024 |
| 2017/0242435 A1* | 8/2017 | Nilsson | G08G 1/167 |
| 2017/0341659 A1* | 11/2017 | Duvernier | B60W 30/143 |
| 2017/0365165 A1* | 12/2017 | Landfors | G06F 16/182 |
| 2017/0369010 A1* | 12/2017 | Tarte | B60L 58/12 |

FOREIGN PATENT DOCUMENTS

| | | | | |
|---|---|---|---|---|
| CN | 103702883 A | | 4/2014 | |
| DE | 10303010 A1 | | 8/2004 | |
| DE | 10314119 A1 | | 10/2004 | |
| DE | 102011009374 A1 | | 8/2011 | |
| DE | 102012011171 A1 | | 12/2013 | |
| DE | 102013009945 A1 | | 12/2013 | |
| DE | 102012211967 A1 | * | 1/2014 | ............. B60K 31/18 |
| DE | 102012023632 A1 | * | 6/2014 | ......... B60L 15/2045 |
| DE | 102014019104 A1 | | 6/2016 | |
| DE | 102015000402 A1 | | 7/2016 | |
| DE | 102015000539 A1 | | 7/2016 | |
| DE | 102015001248 B4 | * | 6/2020 | ......... B60W 30/188 |
| JP | 2014016324 A | * | 1/2014 | ......... B60L 11/1816 |

OTHER PUBLICATIONS

Werther Bernd—English Description of DE-102012023632-A1 via Espacenet Patent Translate, May 13, 2021 (Year: 2021).*

Asai K—English description of JP-2014016324-A, via Espacenet patent translate, retrieved Sep. 20, 2022. (Year: 2022).*

Attensperger T—English description of DE-102015001248-B4, via Espacenet patent translate, retrieved Sep. 22, 2022. (Year: 2022).*

International Search Report and Written Opinion of the International Searching Authority directed to related International Patent Application No. PCT/EP2017/068966, dated Nov. 7, 2017, with attached English-language translation; 26 pages.

International Preliminary Report on Patentability directed to related International Patent Application No. PCT/EP2017/068966, dated Feb. 12, 2019, with attached English-language translation; 14 pages.

* cited by examiner

METHOD FOR ASSISTING A DRIVER IN THE DRIVING OF A MOTOR VEHICLE

TECHNICAL FIELD

The present disclosure relates to a method for assisting a driver with driving a motor vehicle. In addition, the present disclosure relates to a motor vehicle.

BACKGROUND

High efficiency is an essential feature of modern motor vehicles. Moreover, electric motors, which are supplied with energy by on-board batteries, are increasingly used in motor vehicles in addition to an internal combustion engine, or as an alternative thereto. Frequently, multiple operating modes of the motor vehicle are provided, in particular in the case of hybrid or electric vehicles, allowing a selection between high driving power and high energy efficiency. This is relevant, in particular, with purely electrically operated motor vehicles, since selecting an accordingly efficient driving mode can significantly increase the range of the motor vehicle until the next charging process is needed.

The vehicle speed and the acceleration profile when changing between different speeds have the greatest influence on energy consumption. It has therefore been known to reduce a provided power or provided torque in efficiency mode, and thereby achieve energy savings. Additionally, a settable or fixedly predefined speed is provided in some motor vehicles, which cannot be exceeded or can only be exceeded after separate action by a driver, for example when a kickdown is carried out.

Proceeding therefrom, it is the object of the present disclosure to provide an improved method to assist a driver with energy-efficient driving, without excessively limiting driving comfort or driving performance.

SUMMARY

According to embodiments of the present disclosure, the object is achieved by a method of the type mentioned at the outset, comprising the following steps:

ascertaining a maximum permissible driving speed in a route section that is presently driven or will presumably be driven in the future by evaluating environmental data describing the motor vehicle environment;

calculating a target maximum speed, which is lower than the permissible driving speed, by subtracting a predefined reduction amount from the permissible driving speed and/or by multiplying the permissible driving speed by a predefined scaling factor;

controlling at least one alert device for outputting an alert to the driver when a present driving speed of the motor vehicle exceeds the target maximum speed and/or controlling the driving speed of the motor vehicle by a longitudinally guiding driver assistance system, wherein the target maximum speed is used as a maximum speed or as a target speed for the control.

According to embodiments of the present disclosure, it is thus proposed to ascertain what driving speed is actually permissible in the route section that is presently driven or will presumably be driven in the future and to calculate, from this speed, a lower target maximum speed, as a function of which the control or provision of the alert takes place. In contrast to the fixed definition of a certain speed known from conventional techniques, this method has the advantage that the motor vehicle can be driven automatically or in an assisted manner, or by appropriately providing alerts to the driver, at a reduced speed in a significantly larger number of driving situations. If a speed were fixedly predefined, this could only result in a speed reduction for certain driving situations, for example for operation on a freeway or a rural road, but not for operation in cities. In contrast, the method according to embodiments of the present disclosure allows the efficiency to be increased in all driving situations.

The motor vehicle can comprise at least one environment detection device for detecting the environmental data. The environment detection device can be a camera, for example. By evaluating image data of a camera, it is possible to identify road signs, for example, which specify a permissible driving speed. Additionally, further factors can be taken into consideration, which may impact a permissible driving speed, such as weather conditions. In addition or as an alternative, it is also possible to use map data for ascertaining the permissible driving speed, the map data including information about permissible driving speeds. The position of the motor vehicle in relation to this map data can be determined by a position determination device of the motor vehicle, for example a satellite-based positioning system, so as to ascertain an appropriate permissible driving speed. This functionality can be provided by a navigation device of the motor vehicle, for example.

The reduction amount and/or the scaling factor can be fixedly predefined, for example at the factory or by a driver, but can also depend on further parameters that describe a state of the motor vehicle or can be ascertained from the environmental data. For example, the reduction amount and/or the scaling factor may depend on a state of charge of an energy store.

The target maximum speed is always positive and ranges between zero and the permissible driving speed. The control can take place in the form of closed-loop control.

The longitudinally guiding driver assistance system can be a speed limiter, in particular a predictive speed limiter. This may predefine a maximum speed, and in particular the target maximum speed, which must not be exceeded, or no longer than for a predefined time or route interval, or which must not be exceeded without separate action by the driver, for example a kickdown. It is also possible to use a driver assistance system that guides the motor vehicle in an assisted or automated manner as the longitudinally guiding driver assistance system, so that no direct intervention by the driver is required, at least for longitudinal guidance. The driver assistance system can also be a cruise control system, which controls the speed of the motor vehicle to a predefined target speed, and in particular the target maximum speed. The driver assistance system can also be an adaptive cruise control (ACC) system, which, when the motor vehicle is located behind a further motor vehicle, automatically adjusts a distance or else adjusts the speed of the motor vehicle to a target speed, and in particular the target maximum speed.

The target maximum speed can be between 95% and 60% of the permissible driving speed. The ratio of the target maximum speed to the permissible driving speed can depend on several parameters, wherein preferably a predefined reduction is carried out in all instances, and further reductions are implemented as a function of certain conditions or parameters. For example, it may be factory-predefined or predefined by the driver that the target maximum speed is reduced by 5 to 20%, which is to say between 95 and 80% of the permissible driving speed. Further reductions by 5 to 10%, respectively, for example, may be provided as a function of further parameters, which will be described in greater detail hereafter, and may be utilized based on the driving situation. The following examples frequently describe further reductions, which depend only on a single parameter. These reductions can, of course, be freely combined, for example by adding the respective reduction amounts, multiplying the respective scaling factors, or calculating an overall scaling factor by subtracting several reductions, in percent, from 100%. The reduction can take place incrementally, continuously, or continuously starting at a certain limiting value for the parameter. A continuous reduction is possible by way of interpolation from a truth table, for example, which assigns a certain reduction of the target maximum speed to certain parameter values.

The reduction amount and/or the scaling factor can be ascertained as a function of a detected state of charge of an energy store of the motor vehicle and/or a detected fill level of a fuel tank of the motor vehicle. The factory-predefined or driver-predefined reduction amount or scaling factor can be used with a full battery or a full tank. At a fill level between 40 and 60%, and in particular at 50%, a reduction by another 1 to 5%, and in particular by 2%, can take place. At a fill level between 10 and 30%, and in particular at 20%, the further reduction can be increased so as to range between 3 and 10%, and in particular be 5%. The further reduction of the target maximum speed beyond the predefined reduction amount or scaling factor can, as described, take place incrementally, or it is possible to interpolate between the different values.

In addition or as an alternative, the reduction amount and/or the scaling factor can be ascertained as a function of information ascertained by a navigation device, which describes a distance from a predefined destination and/or the road type of the route section that is presently driven or will presumably be driven in the future. In particular, a range surplus can be taken into consideration, which is to say a difference between a residual range calculated as a function of the state of charge of the energy store, or the fill level of the fuel tank, and a distance from the destination. For example, in the case of a residual range of more than 50 km, which is to say a presumable remaining range at the destination of more than 50 km, the target maximum speed cannot be reduced beyond the driver-predefined or factory-predefined reduction amount or scaling factor. If there is a range surplus of 10 to 50 km, the target maximum speed can be reduced by another 3%, and it can be reduced by another 5% if the range surplus is less than 10 km. It is possible to interpolate between the different values, or the reduction can be carried out incrementally. The aforementioned values are provided purely by way of example and can be adapted to the specific motor vehicle. The calculation of residual ranges is known and will not be described in detail. This may be implemented, for example, by taking the average consumption for a time or distance interval lying ahead into consideration. It is also possible for route data of a presumable route to the destination provided by the navigation device to be taken into consideration.

Different reduction amounts and/or scaling factors can be factory-predefined or predefined by the driver for different road types. For example, a higher reduction amount or a smaller scaling factor can be utilized on multi-lane roads since the driving speeds of different motor vehicles can differ on these more drastically, and motor vehicles can be passed more easily, whereby a reduced speed of a motor vehicle will not excessively inhibit the flow of traffic. Accordingly, different reduction amounts or scaling factors can be predefined for freeways, rural roads and roads within towns, for example.

At least one further road user can be detected by at least one environment detection device, wherein the reduction amount and/or the scaling factor are ascertained as a function of a distance and/or a relative speed of the further road user in relation to the motor vehicle. It is thus possible in the method according to embodiments of the present disclosure to adapt the calculation of the target maximum speed to a flow of traffic or the current traffic situation. It was found in this connection that a low speed is perceived to be undesirable by a driver in particular when this differs drastically from the speed of other motor vehicles in the immediate vehicle environment, and in particular in front of or behind the motor vehicle. The acceptance of the method according to embodiments of the present disclosure can be increased by decreasing the reduction amount or selecting a larger scaling factor in such traffic situations. In particular, a road user located behind the motor vehicle, and in particular in the same lane, may be detected as a further road user. The target maximum speed can thus be adapted in such a way that efficient driving of the host motor vehicle does not excessively inhibit the flow of traffic or that the driver does not gain the impression that driving the motor vehicle efficiently interferes with other road users.

The reduction amount and/or the scaling factor can be ascertained as a function of a predefined driver type, or a driver type ascertained during ongoing driving operation of the motor vehicle, and/or as a function of ascertained weather information describing weather conditions at the actual position of the motor vehicle and/or as a function of a present time and/or a present date.

A driver type can be predefined by the user or ascertained or adapted during ongoing driving operation. A driver type can, in particular, describe whether a driver tends toward a more dynamic, spirited driving style or prefers to drive with comfort and/or efficiency in mind. This can be ascertained, for example, by a statistical evaluation of the driving behavior. It is also possible that a corresponding driver type is stored on a device assigned to the driver, for example on a cell phone or a vehicle key, and, during use of the motor vehicle, is transmitted by the driver via the corresponding device to the motor vehicle. Evaluating the driver type makes it possible, for example, to provide for lower reduction amounts or larger scaling factors for spirited, dynamic drivers, whereby a lower gain in efficiency is attained, but driving operation is limited to a significantly lesser degree, whereby the acceptance of the method according to embodiments of the present disclosure can be increased.

Incorporating the date and/or time can be done, in particular, for the purpose of taking appointments of a driver or a motor vehicle occupant into consideration. An appointment database may be provided for this purpose, which is provided in the motor vehicle or able to access the motor vehicle via a communication device of the motor vehicle, and in which the appointments of the driver and/or of at least one vehicle occupant are stored. The appointments may be linked to certain destinations. A remaining driving time can be forecast as a function of the destination and, from this, a presumable arrival time can be determined as a function of the present time. By comparing the presumable arrival time to the time assigned to the appointment, a time buffer can be calculated, which indicates how long before the appointment the vehicle will presumably reach the assigned destination. The reduction amount and/or the scaling factor can be calculated as a function of this time buffer, wherein a lower time buffer results in a lower reduction amount and/or a higher scaling factor, which is to say in less efficient, but faster driving operation, and vice versa.

A speed limiter or a cruise control system or an adaptive cruise control system can be used as the driver assistance system. The speed limiter can, in particular, be a predictive speed limiter, which evaluates environmental data of a route section lying ahead, and determines a limiting speed therefrom. The speed limiter can suppress a provision of torque when the present driving speed is greater than the limiting speed and, potentially, can also intervene in the driving operation by braking. Cruise control or adaptive cruise control systems were already described above.

If an alert is provided when the present driving speed exceeds the target maximum speed, the alert can be output as a haptic alert via a gas pedal of the motor vehicle movable by way of an actuator as the alert device. For example, an alert may be provided in that the actuator builds a counter pressure on the gas pedal, which the driver has to overcome by applying additional force to continue to operate the gas pedal. As an alternative, for example, a vibration of the gas pedal could be excited.

The driving speed of the motor vehicle can be controlled by a longitudinally guiding driver assistance system, wherein the target speed is visualized for the driver by an activation of a display unit precisely when the target speed has changed within a predefined preceding time interval and/or route interval. The target speed can be the target maximum speed. In other words, the target speed may not be displayed during longitudinal guidance by a driver assistance system during time periods in which the target speed does not change for a predefined time and/or route interval. This is advantageous, in particular, when relative large deviations from the target speed, or deviations from the target speed over extended periods, are permitted for efficiency reasons, since the driver could interpret a severe deviation of the shown target speed from the actual driving speed as a malfunction of the cruise control system if the target speed were displayed. Nonetheless, with the proposed method, the target speed is visualized in those instances where it changes, so that a change in the driving behavior remains comprehensible for the driver.

In addition to the method according to embodiments of the present disclosure, the present disclosure relates to a motor vehicle comprising a control unit by way of which the method according to embodiments of the present disclosure can be carried out. The control unit is thus designed to carry out the method according to embodiments of the present disclosure. This can take place by appropriate programming and/or interconnection. It is possible for further components of the motor vehicles to be designed in such a way the motor vehicle is able to carry out the above-described variants of the method according to embodiments of the present disclosure, or parts of these variants. For example, a motor vehicle can comprise an appropriate necessary sensor system, actuators or the like. The motor vehicle according to embodiments of the present disclosure can, of course, be refined with the features described for the method according to embodiments of the present disclosure, having the advantages mentioned there.

The control unit can be configured to switch from a first into a second operating mode when a predefined switching condition is met, and, in the first operating mode, to activate the alert device to output an alert when a present driving speed of the motor vehicle exceeds the permissible driving speed and/or to use the permissible driving speed as the maximum speed or the target speed for controlling the speed and, in a second operating mode, to carry out the method according to embodiments of the present disclosure. The control unit can thus carry out the method according to embodiments of the present disclosure only in a certain operating mode, for example in an efficiency mode, and the provision of an alert or control of the driving speed can be based on the ascertained permissible driving speed in a further operating mode. The switching between the operating modes can take place as a function of an operating input by the driver. However, it is possible, in addition or as an alternative, for the switching to be carried out as a function of certain driving parameters, which will be described in greater detail hereafter. The transition between the two operating modes can take place by hard switching; however, it is also possible for an essentially continuous transition to take place. This is possible, for example, in that a target maximum speed is calculated in the first operating mode and utilized as described above, but that a scaling factor of 1 or a reduction amount of 0 is used for calculating this target maximum speed. In this way, switching into the second operating mode takes place by reducing the scaling factor or increasing the reduction amount.

The control unit can be configured to switch from the second to the first operating mode when a predefined further switching condition is met. The further switching condition can be that the switching condition is not met. An appropriate procedure is advantageous, in particular, when the switching takes place as a function of operating inputs of a driver, whereby the driver can switch between the two operating modes. If switching takes place as a function of driving parameters, it is advantageous when the further switching condition is selected in such a way that hysteretic switching takes place, which is to say that the operating mode is not switched within a certain parameter interval, regardless of the presently used operating mode.

Meeting the switching condition may depend on a detected state of charge of an energy store of the motor vehicle and/or on a detected fill level of a fuel tank of the motor vehicle and/or on information providable by a navigation device of the motor vehicle which describes a distance from a predefined destination and/or the road type of the route section that is presently driven or will presumably be driven in the future, and/or on a predefined driver type, or a driver type ascertained during ongoing driving operation of the motor vehicle, and/or on ascertained weather information describing weather conditions at the actual position of the motor vehicle and/or on a present time and/or a present date and/or on a distance and/or a relative speed of a detected further road user in relation to the motor vehicle.

For this purpose, the dependencies and evaluation options described above for adapting the reduction amount or the scaling factor may be used for determining the operating state. For example, as described above, a range surplus can be ascertained, and it can be determined as a function of the ascertained range surplus whether the control unit is to be operated in the first or in the second operating mode. As a further example, the above-described time buffer between an appointment stored in an appointment database and a presumable arrival time can be evaluated, and it can be determined as a function of this time buffer whether the control unit is operated in the first or second operating mode.

The above-described dependencies for the switching condition can also be used for the further switching condition. Particularly advantageously, the further switching condition can evaluate the distance and/or relative speed of the detected further road user. For example, a switch back into the first operating mode can be carried out when the traffic density around the motor vehicle is high and the further road users are driving faster than the host motor vehicle, or when a motor vehicle in the same lane is following closely.

In the second operating mode, the control unit can deactivate at least one load of the motor vehicle or switch this into an energy-saving mode and/or activate at least one driving motor of the motor vehicle in such a way that a maximally provided power and/or a maximally provided torque and/or a provided power and/or a provided torque are less than in the first operating mode in at least one predefined pedal position of a gas pedal of the motor vehicle. The deactivated loads may be comfort loads, and in particular an air conditioning system.

Lowering the provided power and/or torque affects acceleration in particular. A dependence of the provided power and/or the provided torque on the pedal position can be predefined in the form of a transfer function, for example a gas pedal characteristic curve. This may be flatter in the second operating mode, which is to say a change in the pedal position can result in a small change of the provided torque or the provided power.

It is also possible for the control unit to be operated in a third operating mode in which loads of the motor vehicle are deactivated or switched into an energy-saving mode and/or, as described above, power levels or torque levels are reduced, wherein a provision of an alert, a limitation of the speed and/or a control of the speed do not take place or take place as a function of the permissible driving speed. This third operating mode can be manually selectable or be selected automatically. The third operating mode can, in particular, be an intermediate stage of the driving parameter-dependent control process, so that initially a switch from the first operating mode into the third operating mode is made when a driving parameter changes, for example when a state of charge of an energy store is reduced or a range surplus is reduced below a limiting value, and a switch into the second operating mode only takes place when the state of charge or the range surplus decreases further below a further limiting value.

The control unit can be configured to control the driving speed by way of the longitudinally guiding driver assistance system, both in the first operating mode and in the second operating mode, in such a way that the driving speed is within a tolerance interval around the target speed, wherein the tolerance interval is greater in the second operating mode than in the first operating mode. The target speed can, in particular, be the target maximum speed. The described procedure allows the efficiency of the operation of the motor vehicle in the second operating mode to be further increased since the tolerance interval can be utilized to optimize efficiency. Efficiency optimization through a use of tolerance intervals around a target speed is known in principle. For example, elevation profiles of the course of a road can be taken into consideration, whereby the motor vehicle is able to gain momentum downhill so as to require less energy for driving uphill, or the like. Appropriate tolerance intervals also make it possible to respond with delay to adaptations in the target speed, requiring less strong acceleration and/or braking processes, which can further increase efficiency. Tolerance intervals are limited in conventional techniques in that a permissible driving speed is generally not to be exceeded, or to be exceeded only insignificantly. Since, according to embodiments of the present disclosure, a lower target maximum speed is predefined as the maximum or target speed in the second operating mode for controlling the driving speed, larger tolerance intervals can be utilized in this operating mode, whereby the efficiency of the driving operation can be further increased.

With respect to the tolerance intervals, it shall be noted that it is certainly possible for the driving speed to depart from the tolerance interval in certain driving situations. At least one additional condition can be predefined, wherein the driving speed is only maintained if the additional condition is met, or not met, in the tolerance interval. For example, a minimum distance with respect to further road users can be predefined, wherein the driving speed is also lowered below the tolerance interval, or the like, when a drop below the minimum distance occurs.

BRIEF DESCRIPTION OF THE DRAWINGS

Other advantages, features and details of the present disclosure result from the claims, the description of embodiments below, and the drawings, in which:

DETAILED DESCRIPTION

Figure 1:
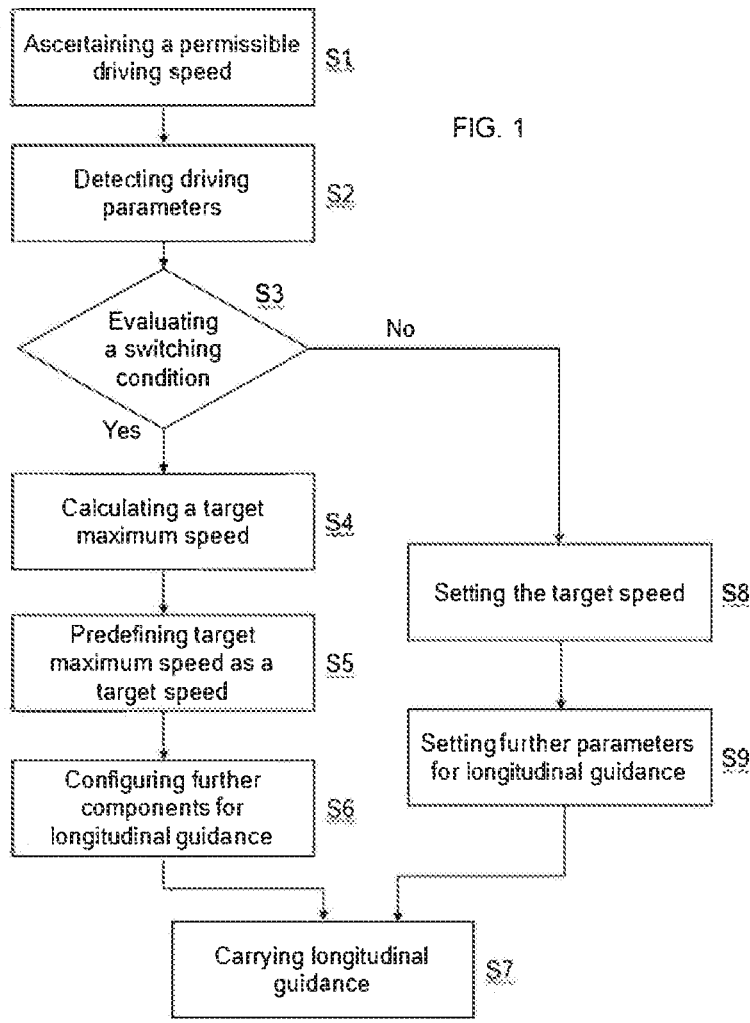
FIG. 1 shows a flow chart of an example method according to embodiments of the present disclosure.

FIG. 1 shows a flow chart of a method for assisting a driver with driving a motor vehicle according to embodiments of the present disclosure. In step S1, a permissible driving speed of a route section that is presently driven or will presumably be driven in the future is ascertained. This takes place by the evaluation of environmental data describing the motor vehicle environment. The environmental data can be obtained, for example, in that the front motor vehicle environment is covered by a camera on the motor vehicle. By processing the image data of the camera, traffic signs or other indications of permissible driving speeds can be identified, and the permissible driving speed can be ascertained.

As an alternative or in addition, it is possible to utilize map data describing the environment of the motor vehicle as environmental data. The map data can be kept available locally in the motor vehicle, for example, or be provided via a wireless data link. A position detection device, such as a GPS sensor, of the motor vehicle can be used to determine a present position of the motor vehicle and, based on this position, select map data that relates to the route section that is presently driven or will presumably be driven in the future. Permissible driving speeds for the individual route sections may be stored in the map data, whereby an additional driving speed can also be determined thereby.

In step S2, driving parameters are detected, as a function of which the permissible driving speed can be processed, as will be described hereafter. These driving parameters are later evaluated so as to ascertain the degree to which the efficiency of a driving operation is to be increased by driving the motor vehicle more slowly than at the permissible driving speed. Driving parameters that may be relevant for this purpose include a state of charge of an energy store or a fill level of a fuel tank of the motor vehicle, information provided by a navigation device of the motor vehicle describing a distance from a predefined destination and/or the road type of the route section, a predefined driver type or a driver type ascertained during ongoing driving operation of the motor vehicle, ascertained weather conditions at the actual position of the motor vehicle, a present time or a date and/or data of further road users, in particular the distance or relative speed thereof in relation to the host motor vehicle.

The detected data can used directly for parameterizing the following method steps, or further variables can be calculated from these parameters. For example, a residual range can be forecast for the motor vehicle from the state of charge of the energy store, or the fill level of the fuel tank, and the residual range can thereafter be evaluated as a driving parameter. If a corresponding residual range was calculated, and additionally a distance from a predefined destination was ascertained, in addition or as an alternative a range surplus can be calculated from the difference of the residual range and the distance from the predefined destination and be taken into consideration thereafter as a driving parameter. A time or a date can, in particular, be taken into consideration in such a way that an appointment time for an appointment at a predefined destination is ascertained from an appointment database, which is kept available in the motor vehicle or is provided to the motor vehicle by a third device, such as a cell phone. Additionally, conventional techniques can be used to ascertain a forecast arrival time at the predefined destination. A time buffer can be calculated from the time difference between the arrival time and the appointment time, indicating how much time ahead of the appointment the motor vehicle will presumably reach the destination. This time buffer can be evaluated in the further method as a driving parameter.

In step S3, the control unit of the motor vehicle evaluates a switching condition, the fulfillment of which depends at least partially on the driving parameters discussed for step S2. The switching condition can, in particular, depend on a comparison between at least one of the driving parameters and a respective limiting value. The results of the comparison may be linked by "and" and/or "or." For example, the switching condition can be met when the state of charge of an energy store of the motor vehicle and/or a range surplus are below a respective limiting value.

If the switching condition is met, the control unit is operated in the second operating mode, and the method is continued starting with step S4. Otherwise, the control unit is operated in the first operating mode, and the method is continued starting with step S8.

In step S4, a target maximum speed is calculated, which is lower than the permissible driving speed ascertained in step S1. This is done by subtracting a predefined reduction amount from the permissible driving speed or by multiplying the permissible driving speed by a predefined scaling factor. The reduction amount or the scaling factor are predefined as a function of at least some of the driving parameters ascertained in step S2. This will be described hereafter based on the example of a scaling factor. A first reduction, which can range between 5 and 20%, and in particular be 10%, for example, can be factory-predefined or set by a driver. If no further reduction is carried out based on the driving parameters, a scaling factor between 80 and 95%, and preferably of 90% thus results. This scaling factor can be further reduced as a function of different driving parameters. For example, a current state of charge of an energy store or a residual range can be considered. If the energy store is fully charged, the scaling factor is not further reduced. If the energy store is half full, the scaling factor can be reduced by another 3%, for example, and it can be reduced by another 5% if the energy store is almost empty, for example in the case of a state of charge of less than 20%. The further reduction of the scaling factor can take place incrementally, or it is possible to interpolate between the different aforementioned values.

In addition or as an alternative, as is described for step S2, a range surplus can be calculated, wherein the scaling factor is not further reduced in the case of a range surplus of more than 50 km, is reduced by another 3%, for example, in the case of a range surplus between 10 and 50 km, and is reduced by another 5%, for example, in the case of a critical range surplus of less than 10 km. In this case as well, the reduction can take place incrementally, or it is possible to interpolate between individual values.

The calculated further reduced, or not further reduced, scaling factor is subsequently multiplied by the permissible driving speed to ascertain a target maximum speed.

In step S5, the target maximum speed ascertained in step S4 is predefined as a target speed for controlling a vehicle speed by a driver assistance system. To clearly illustrate the essential features of the method, it shall be assumed hereafter that the driver assistance system is a cruise control system that carries out the longitudinal guidance of the motor vehicle in such a way that the driving speed is maintained within a tolerance interval around the target speed. In alternative embodiments, it would be possible to control the speed under further framework conditions, which is to say, in particular, to implement adaptive cruise control in which a distance with respect to a preceding vehicle is controlled to a predefined value as long as the host motor vehicle follows a further motor vehicle, and to control the speed to the target speed only in the case where no preceding motor vehicle is detected. In a further alternative implementation option, it would be possible to control a driver assistance system by limiting a maximum driving speed to the target maximum speed, or by providing an alert, and in particular a haptic alert via a gas pedal, to a driver when the target maximum speed is exceeded.

In step S6, further components of the motor vehicle relating to the longitudinal guidance of the motor vehicle are configured. Since the motor vehicle is operated in the second operating mode, a tolerance interval is predefined for the cruise control system which is greater than in the case of the first operating mode, which will be described below. Furthermore, a power provided by a drive system of the motor vehicle, or a provided torque, is limited. Thereafter, the longitudinal guidance is carried out in step S7 in accordance with the parameters established in step S5 and in step S6. The longitudinal guidance is carried out as is known, wherein, however, the target maximum speed is used as the target speed, instead of a target speed selected manually by the driver. Thereafter, the method is repeated starting with step S1.

In the first operating mode, which is to say when the switching condition in step S3 is not met, the method is continued with step S8 by setting the target speed or the maximum speed for automatic longitudinal guidance of the motor vehicle equal to the permissible driving speed. In step S9, the further parameters for longitudinal guidance are then set. Here, a narrower tolerance range than is discussed for step S6 is selected, since the motor vehicle is already being moved at the permissible driving speed, and accordingly no major excursions of the driving speed should occur. Moreover, the longitudinal guidance takes place in such a way that the power provided by the drive system and the provided torque are not limited. Thereafter, the longitudinal guidance is carried out as was already described in step S7.

Figure 2:
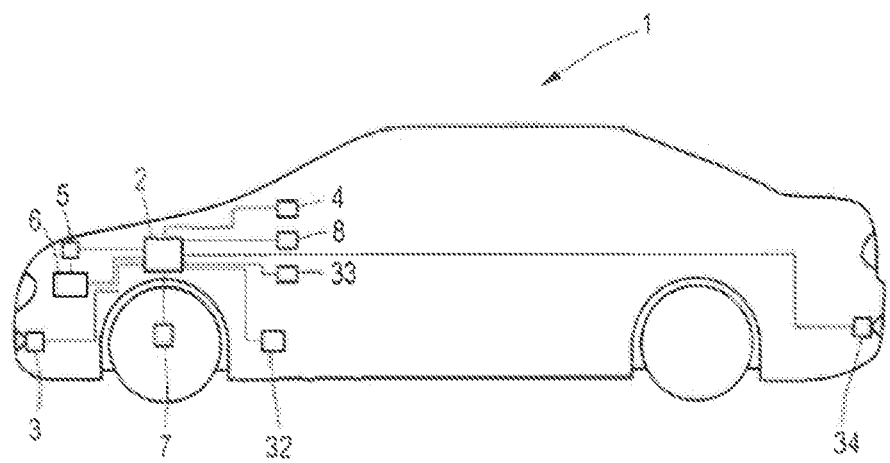
FIG. 2 shows an example motor vehicle according to embodiments of the present disclosure.

FIG. 2 shows an exemplary embodiment of a motor vehicle 1 comprising a control unit 2 designed to carry out the method described above. Using an environment detection device 3, this being a camera in the front region of the motor vehicle, the environmental data describing the motor vehicle environment is detected. The image data detected by the camera is processed by the control unit 2 to ascertain a permissible driving speed. This can take place by an identification of road signs in the image data. As an alternative or in addition, information concerning a permissible driving speed can also be provided by the navigation device 4. The navigation device 4 comprises a position detection device 5 for detecting the vehicle position, such as a GPS sensor, and a memory device, which stores map data and a road network with assigned permissible driving speeds. The additional driving speed can be ascertained from this information and provided to the control unit 2.

As was described with respect to FIG. 1, the control unit 2 has two operating modes, wherein, in a second operating mode, the efficiency of the motor vehicle 1 is increased by controlling a speed not as a function of the permissible driving speed, but as a function of a lower target maximum speed compared thereto. The corresponding procedure was already described with respect to FIG. 1. To make this possible, the control unit 2 communicates with multiple further components of the motor vehicle 1. An energy store 5 provides a current state of charge of the energy store 5. From the change of the state of charge over time, the control unit 2 can calculate a presumable range of the motor vehicle 1, for example. The navigation device 4 provides information concerning a presently driven road type and concerning a distance from a predefined destination. From this, the control unit 2 can calculate a range surplus, for example.

So as to observe the flow of traffic around the motor vehicle 1, moreover a further environment detection device 34, this being a further camera, is provided in the rear of the motor vehicle. From the environmental data provided by the environment detection device 3 and the further environment detection device 34, the control unit 2 is able to ascertain information about the surrounding flow of traffic and, for example in the case of high traffic density and, in particular, further motor vehicles located in particular closely behind the motor vehicle 1, the control unit can be operated in the first operating mode or relatively high scaling factors or relatively low reduction amounts can be used to reduce the driving speed of the motor vehicle 1 only slightly or not at all.

For the longitudinal guidance of the motor vehicle, the control unit 2 can activate both a driving motor 6 of the motor vehicle and brakes 7 of the motor vehicle so as to predefine the driving speed of the motor vehicle. The control unit 2 furthermore controls a display unit 8 to inform the driver about the current driving operation. The display unit 8 shows the current speed and, depending on the driving situation, a target speed of the cruise control system. The target speed is displayed only in driving situations in which the target speed was recently adjusted, and the actual speed is thus updated to the new target speed. In areas in which the predefined target speed is constant, the target speed is not displayed since, due to the large tolerance ranges utilized in the second operating mode, large deviations may result between the target speed and the actual speed, which a driver could interpret as a malfunction of the cruise control system.

The control unit 2 can also be operated in a further operating mode, which essentially corresponds to the second operating mode, wherein, instead of controlling the vehicle speed as a function of the target maximum speed, the target maximum speed is utilized to alert the driver when the current speed exceeds the target maximum speed when the motor vehicle is driven manually. For this purpose, the alert device 32 is activated in this case, which is formed by a gas pedal of the motor vehicle movable by way of an actuator. The activation takes place in such a way that a counter pressure is built on the gas pedal when the target maximum speed is reached, whereby a driver is alerted that he or she is not to drive faster. As an alternative, it would be possible, for example, to cause the gas pedal 32 to vibrate so as to provide an alert to the driver.

The motor vehicle 1 furthermore comprises a load 33, for example an air conditioning system, which is deactivated when the control unit 2 is being operated so as to further increase the energy efficiency of the motor vehicle 1.

Figure 3:
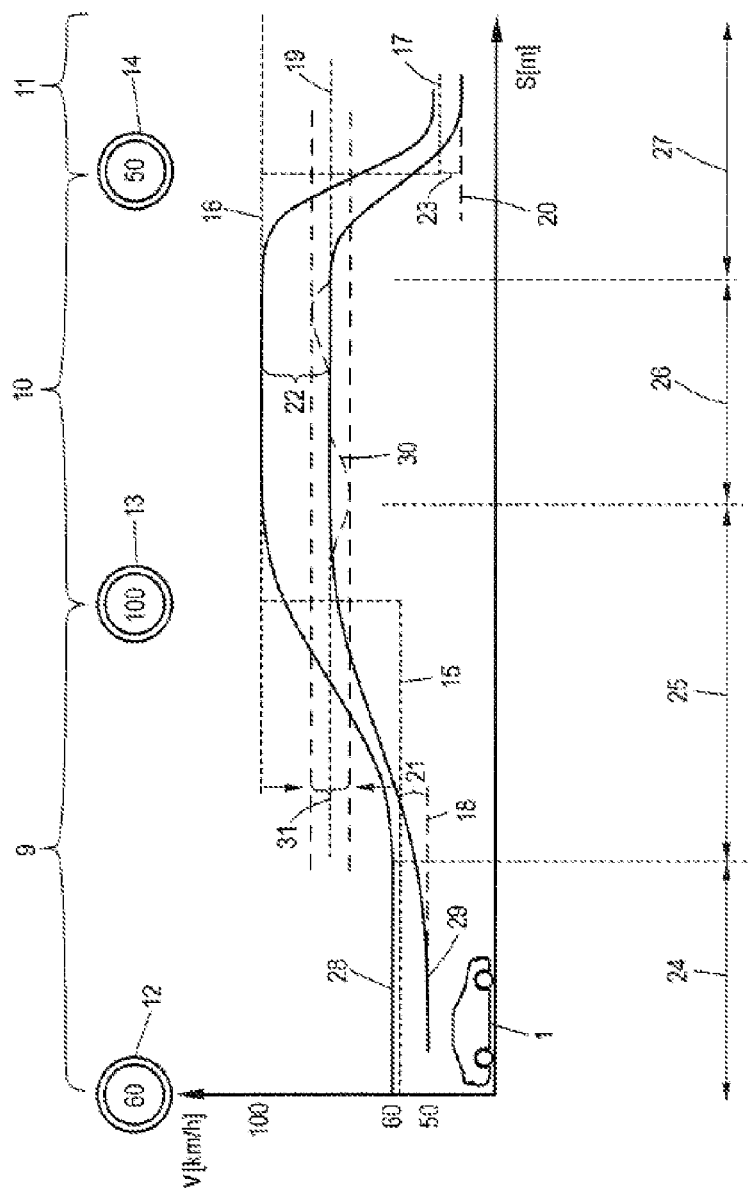
FIG. 3 shows example speed curves when a motor vehicle according to embodiments of the present disclosure is driven along a driving route in different operating modes of the motor vehicle.

FIG. 3 shows the differences between the different operating modes of the motor vehicle 1 described with respect to FIGS. 1 and 2 during a driving operation along a route comprising three route sections 9, 10, 11, each having a predefined permissible driving speed 12, 13, 14. The speed profile for the motor vehicle 1 in the first operating mode is represented by the curve 28, and the speed profile for the second operating mode is represented by the curve 29. The control in the first operating mode is carried out in such a way that the target speeds 15, 16, 17 for the route sections 9, 10, 11 are each predefined as the permissible driving speed 12, 13, 14 in the corresponding route section 9, 10, 11. Since additionally the power and the torque of the driving motor 6 are not limited, a change between the target speeds 15, 16, 17 takes place over relatively short distances.

In the second operating mode, in contrast, target maximum speeds are predefined as the target speeds 18, 19, 20, which, as was described with respect to FIG. 1, are calculated by multiplying the permissible driving speeds 12, 13, 14 by predefined scaling factors. The target speeds 18, 19, 20 are lower by reduction amounts 21, 22, 23 than the target speeds 15, 16, 17 in the first operating mode, respectively. Since moreover a power and a torque of the driving motor 6 of the motor vehicle 1 are limited in the second operating mode, the change between the target speeds 18, 19, 20 takes place over longer distances than the change between the target speeds 15, 16, 17 in the first operating mode.

So as to further increase the energy efficiency in the second operating mode, additionally a larger tolerance interval 31 is used in the second operating mode than in the first operating mode. This is indicated by the dotted deviations 30 of the driving speed in the second operating mode.

As was described above with respect to FIG. 2, the target speed is to be displayed in the motor vehicle 1, at least in the second operating mode, only in areas in which a switch is made between different target speeds. Thus, the target speed is not shown in the area 24 and the area 26, and it is shown in the areas 25 and 27.

The invention claimed is:

1. A method for assisting a driver with driving a motor vehicle, the method comprising:

ascertaining, by a controller of the motor vehicle, a permissible driving speed in a route section that is presently driven or may be driven in a future by evaluating environmental data describing a motor vehicle environment;

comparing, by the controller, a residual range of the motor vehicle to a distance from a predefined destination, the residual range determined based at least in part on a detected state of charge of an energy store of the motor vehicle or a detected fill level of a fuel tank of the motor vehicle, the distance from the predefined destination determined by a navigation device of the motor vehicle;

ascertaining, by the controller, at least one of a predefined reduction amount or a predefined scaling factor as a function of at least a range surplus determined from the comparing, wherein the at least one of the predefined reduction amount or the predefined scaling factor is ascertained based at least in part on a distance of the range surplus being less than a first distance threshold and a driver type, the driver type being ascertained based at least in part on a statistical evaluation of a driving behavior of the driver;
ascertaining, by the controller, at least one of a further reduction amount or a further scaling factor based at least in part on the distance of the range surplus being less than a second distance threshold;
calculating, by the controller, a target maximum speed, which is lower than the permissible driving speed, by at least one of subtracting the predefined reduction amount and the further reduction amount from the permissible driving speed or multiplying the permissible driving speed by the further scaling factor; and
instructing, by the controller, a longitudinally guiding driver assistance system of the motor vehicle to control a driving speed of the motor vehicle based at least in part on the target maximum speed, wherein the target maximum speed is used as a maximum speed or as a target speed.

2. The method according to claim 1, wherein the target maximum speed is between 95 percent and 60 percent of the permissible driving speed.

3. The method according to claim 1, wherein the ascertaining at least one of the predefined reduction amount or the predefined scaling factor further comprises:
ascertaining, by the controller, at least one of the predefined reduction amount or the predefined scaling factor as a function of road type information, the road type information describing a road type of the route section that is presently driven or may be driven in the future.

4. The method according to claim 1, further comprising:
detecting, by an environment detection device, at least one further road user; and
ascertaining at least one of the predefined reduction amount or the predefined scaling factor as a function of at least one of a distance or relative speed of the further road user in relation to the motor vehicle.

5. The method according to claim 4, wherein detecting the at least one further road user includes detecting a road user located behind the motor vehicle and in a same lane as the motor vehicle.

6. The method according to claim 1, further comprising:
ascertaining at least one of the predefined reduction amount or the predefined scaling factor as a function of at least one of weather information describing weather conditions at an actual position of the motor vehicle, a present time, or a present date.

7. The method according to claim 1, wherein a speed limiter, a cruise control system, or an adaptive cruise control system is used as the driver assistance system.

8. The method according to claim 1, further comprising:
detecting that a present driving speed of the motor vehicle has exceeded the target maximum speed; and
controlling at least one alert device to provide a notification to the driver, wherein the notification comprises a haptic notification via a gas pedal of the motor vehicle movable by way of an actuator as the at least one alert device.

9. The method according to claim 1, wherein the driving speed of the motor vehicle is controlled by the longitudinally guiding driver assistance system, the method further comprising:
visualizing the target maximum speed for the driver by an activation of a display unit when the target maximum speed has changed within at least one of a predefined preceding time interval or a route interval.

10. A motor vehicle comprising a controller, the controller configured to:
ascertain a permissible driving speed in a route section that is presently driven or will presumably be driven in the future by evaluating environmental data describing a motor vehicle environment;
compare a residual range of the motor vehicle to a distance from a predefined destination, the residual range determined based at least in part on a detected state of charge of an energy store of the motor vehicle or a detected fill level of a fuel tank of the motor vehicle, the distance from the predefined destination determined by a navigation device of the motor vehicle;
ascertain at least one of a predefined reduction amount or a predefined scaling factor as a function of at least a range surplus determined from the comparing, wherein the at least one of the predefined reduction amount or the predefined scaling factor is ascertained based at least in part on a distance of the range surplus being less than a first distance threshold and a driver type, the driver type being ascertained based at least in part on a statistical evaluation of a driving behavior of a driver of the motor vehicle;
ascertain at least one of a further reduction amount or a further scaling factor based at least in part on the distance of the range surplus being less than a second distance threshold;
calculate a target maximum speed, which is lower than the permissible driving speed, by at least one of subtracting the predefined reduction amount and the further reduction amount from the permissible driving speed or multiplying the permissible driving speed by the further scaling factor; and
instruct a longitudinally guiding driver assistance system of the motor vehicle to control a driving speed of the motor vehicle based at least in part on the target maximum speed, wherein the target maximum speed is used as a maximum speed or as a target speed.

11. The motor vehicle according to claim 10, wherein the controller is configured to switch from a first operating mode into a second operating mode when a predefined switching condition is met, and wherein, in the first operating mode, the controller is further configured to activate at least one alert device to output an alert when the present driving speed of the motor vehicle exceeds the permissible driving speed or to use the permissible driving speed as the maximum speed or the target speed.

12. The motor vehicle according to claim 11, wherein the controller is further configured to determine that the predefined switching condition is met based at least in part on at least one of a detected state of charge of an energy store of the motor vehicle, a detected fill level of a fuel tank of the motor vehicle, information providable by the navigation device of the motor vehicle which describes a distance from a predefined destination, the road type of the route section that is presently driven or will presumably be driven in the future, ascertained weather information describing weather conditions at the actual position of the motor vehicle, a present time, a present date, a distance, or a relative speed of a detected further road user in relation to the motor vehicle.

13. The motor vehicle according to claim 11, wherein the controller, in the second operating mode, is configured to deactivate at least one load of the motor vehicle, switch into an energy-saving mode, or activate at least one driving motor of the motor vehicle in such a way that at least one of a maximally provided power, a maximally provided torque, a provided power, or a provided torque are less than in the first operating mode in at least one predefined pedal position of a gas pedal of the motor vehicle.

14. The motor vehicle according to claim 11, wherein the controller is configured to control the driving speed by way of the longitudinally guiding driver assistance system, both in the first operating mode and in the second operating mode, in such a way that the driving speed is within a tolerance interval around the target speed, wherein the tolerance interval is greater in the second operating mode than in the first operating mode.

* * * * *